United States Patent [19]

Rawlins

[11] 3,925,594

[45] Dec. 9, 1975

[54] SUPPRESSION OF WAKE-INDUCED OSCILLATIONS IN A CONDUCTOR BUNDLE

[75] Inventor: Charles B. Rawlins, Massena, N.Y.

[73] Assignee: Aluminum Company of America, Pittsburgh, Pa.

[22] Filed: Dec. 16, 1974

[21] Appl. No.: 532,742

[52] U.S. Cl. .................... 174/42; 174/43; 174/146
[51] Int. Cl.² ...................... H02G 7/14; H02G 7/12
[58] Field of Search ......... 174/33, 40 R, 41, 42, 43, 174/45 R, 146, 147, 149 R

[56] References Cited
UNITED STATES PATENTS 3,613,104  10/1971  Bradshaw .............................. 174/42

FOREIGN PATENTS OR APPLICATIONS

| 58,711 | 4/1913 | Austria .............................. 174/45 R |
| 121,705 | 3/1931 | Austria .............................. 174/42 |
| 1,563,904 | 3/1969 | France .............................. 174/146 |
| 1,003,303 | 2/1957 | Germany .............................. 174/147 |
| 1,220,084 | 1/1971 | United Kingdom .............................. 174/42 |
| 262,203 | 1/1970 | U.S.S.R. .............................. 174/43 |

*Primary Examiner*—Laramie E. Askin
*Attorney, Agent, or Firm*—Elroy Strickland, Esq.

[57] ABSTRACT

An aerodynamically stable, overhead conductor bundle having spacers located between conductor supporting insulators, the conductors of the bundles being in vertically varying positions relative to one another, between the supporting the insulators. The invention is directed to both structure and method.

7 Claims, 12 Drawing Figures

PRIOR CONSTRUCTION

PRIOR CONSTRUCTION

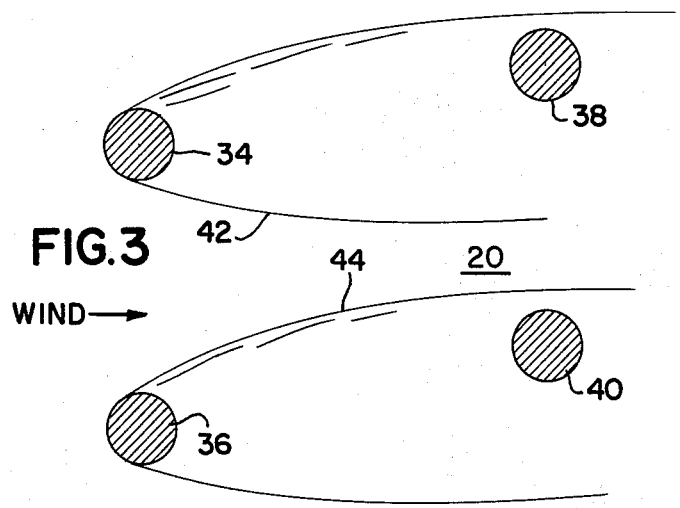
FIG.3
WIND →
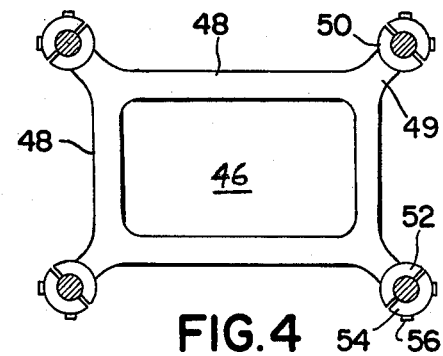
FIG.4 PRIOR CONSTRUCTION
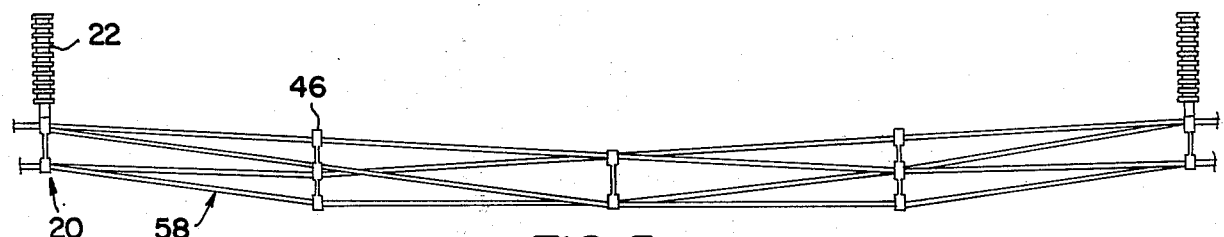
FIG. 5 PRIOR CONSTRUCTION
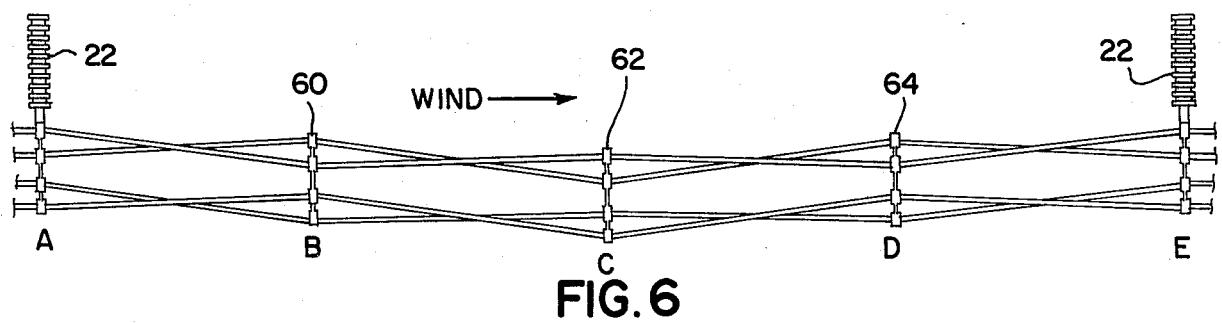
FIG.6

SUPPRESSION OF WAKE-INDUCED OSCILLATIONS IN A CONDUCTOR BUNDLE

BACKGROUND OF THE INVENTION

The invention generally relates to devices and methods for suppressing aerodynamic instability of a conductor bundle or bundles, such as employed in overhead transmission lines. The type of instability to which the invention is particularly directed is known as wake-induced oscillation.

In conventional bundle constructions of three or more conductors or subconductors, there is usually at least one conductor located in the same general plane of and downwind from a companion conductor, with the cross section of the bundle being substantially uniform along its length. It has been found that the wake produced behind the windward, upwind conductor of a conductor bundle, with the wind flowing across the bundle, produces forces on the downwind or leeward conductor that vary in a manner that causes the leeward conductor to oscillate. The wind forces acting upon the leeward conductor are subjected to small, complex variations caused by the leeward conductor occupying slightly different positions within the wake of the windward conductor at successive instants of time. These small variations in the wind forces synchronize with the leeward conductor motions since they are caused by them, and, with certain patterns of motion serve to reinforce or assist leeward conductor motion and hence to increase the amplitude of the motion. If, for example, the wind forces acting on the leeward conductor vary rapidly with respect to the position of the conductor in the wake, then small motions of the leeward conductor result in large variations in these wind forces, with the small motion being vigorously assisted. If, on the other hand, wind forces on the leeward conductor vary only slightly with conductor position, then small motions will result in small variations in these forces, such variations being too small to overcome the resistance of the air to the leeward conductor motion so that the motion of the conductor is essentially damped by the resistance of the air.

By observation on actual transmission lines, the wake-induced oscillations take place in certain modes. The motion is essentially transverse to the axes of the conductors and is rather like the motion of a skip rope being swung by two children (with a third child jumping in the middle). The motion is that of a sine shaped loop which may have amplitude in both horizontal and vertical directions, with each point on the rope or conductor sweeping a circular or elliptical orbit.

Further, in transmission lines, the loops are long and are so positioned that their nodes coincide with conductor spacers or with tower supports. The loops will thus, in general, be somewhere between 100 and 300 feet long. An oscillation loop of such length, and being subjected to wind forces distributed over its entire length, responds to these wind forces. If these distributed forces act in concert, they augment small motions of the loops. Since the forces acting at any point of the conductor depend solely upon the strength of the wind and the position of the leeward conductor relative to the wake of the windward conductor, the forces act mostly in concert when the leeward conductor occupies the same wake position all along the length of the loop. This entails having the separation between the conductors constant, a condition satisfied in normal parallel bundle construction, and having the position of the leeward conductor above or below the center line of the wake constant, again, a condition normally satisfied or approached in normal construction.

If relative position in the wake varies over the length of the loop, then small motions of the loop will result in a variation of forces acting on the leeward conductor at different points along its length. These forces will then not be acting fully in concert and will tend, instead, to oppose one another and to cancel one another. The practical effect of this is to make the loop respond as though the leeward conductor occupied a constant wake position at which the wake forces vary only slightly with the wake position. If actual wake position varies enough over the length of the loop, the wake forces acting in concert will be minimized such that they cannot sustain even small loop motions against the resistance of the air.

In order to accomplish this variation in the wake position of the leeward conductor, and the resulting minimization of concerted action of the forces causing oscillation, conductor bundles have been provided with a twisted cross section as the bundle progresses from tower to tower. This requires stringing and installing the conductors in a normal parallel position, followed by bodily removal of the bundle from yokes and hangers supporting the bundle and rotating the bundle about the bundle axis. This practice must be carried out at every other tower, which practice is awkard and costly since the conductors of the bundle are heavy and are under substantial tension.

As just discussed, variations in wind forces with wake-position cause wake-induced oscillations. It has been determined by extensive wind tunnel experiments with these forces that the variations in such forces are much more rapid across the wake than along the wake. For this reason, the concerted action of these force variations may be much more effectively distributed or reduced by variations of the "across" wake position of the leeward conductor than by the "along" wake variation.

In view of this fact, the distortion of the bundle into a twisted form includes components of distortion of little or no value in effecting the control of the wake-induced oscillations. Only the distortion in the across wake or vertical direction are of significant value. In addition, the along wake position, which is a horizontal distortion or deviation from the normal parallel conductor configuration, which is a necessary result of the twisted bundle, has serious detrimental effects aside from contributing nothing significant to the suppressing of the oscillations.

For example, the practical difficulties of constructing a twisted bundle represent one detrimental effect. A second more subtle detrimental effect results from the fact that the twisted bundle must be held in its twisted position by application of torque to the bundle at supporting structures since the direction of the twist will reverse at each structure using a practical construction.

Finally, twisted bundle spans are prone to shift all of their twist into a single sub-span between two spacers, with the conductors wrapped together like a rope in that sub-span, and with the other sub-spans retaining little twist and hence exposed again to wake forces acting in concert. A sub-span is a segment of the span between two adjacent towers formed by adjacent spacers or by a tower and an adjacent spacer.

BRIEF SUMMARY OF THE INVENTION

The present invention is directed to eliminating the gross twist of the bundle, which considerably reduces the cost and the difficulty of constructing and stringing the bundle, as well as eliminating the torque at towers and the possibility of the twist concentrating itself in one sub-span of the bundle. The invention comprises a structure and a method that achieves the objective of distorting the bundle primarily in its vertical, across the wake position without the detrimental effect of bodily twisting the bundle.

As described in detail hereinafter, the invention includes spacers, which spacers include bundle supporting yokes, for spacing three or more conductors of a conductor bundle in which conductor retaining clamps of the spacers are so positioned with respect to each other that, when they are installed in the bundle, the conductors of the bundle are forced to follow paths that meander in a vertical plane as they progress from spacer to spacer and from tower to spacer. Further, the clamps of the spacers and yokes are so disposed that the conductors in question meander in opposite directions, up and down, in progressing from spacer to spacer and from spacer to yoke (at the tower support). Such a structure avoids the disadvantages of the twisted bundle construction while simultaneously greatly enhancing oscillation suppression capabilities.

THE DRAWINGS

The invention, along with its objectives and advantages will be better understood from consideration of the following detail description and the accompanying drawings in which:

FIG. 3 is a further enlarged section useful in explaining aerodynamic properties of the bundles of FIG. 2;

FIG. 4 shows a schematic section of a conductor bundle constituting one phase of a transmission line, and a prior spacer structure spacing the conductors of the bundle;

FIG. 5 is a side elevation view of a prior bundle construction;

FIG. 6 is a side elevation view of a conductor bundle constructed in accordance with the principles of the present invention.

PREFERRED EMBODIMENTS OF THE INVENTION

Figure 1:
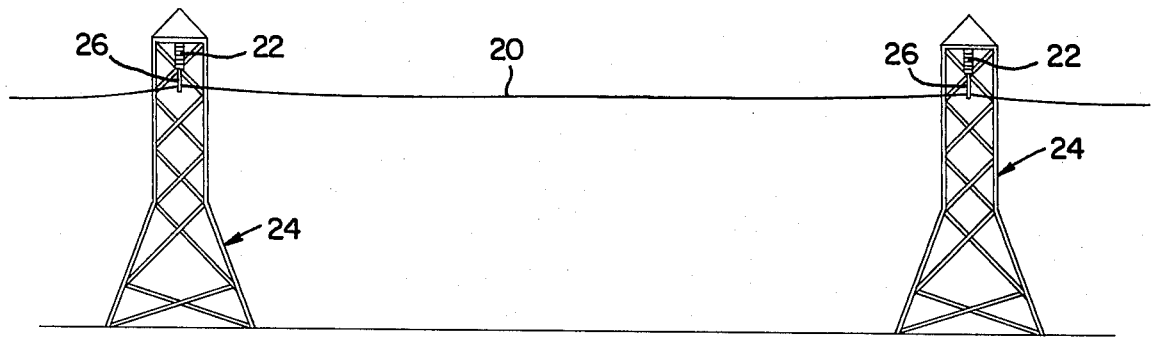
FIG. 1 is a fragmentary side elevation of a conventional transmission line construction.
Figure 2:
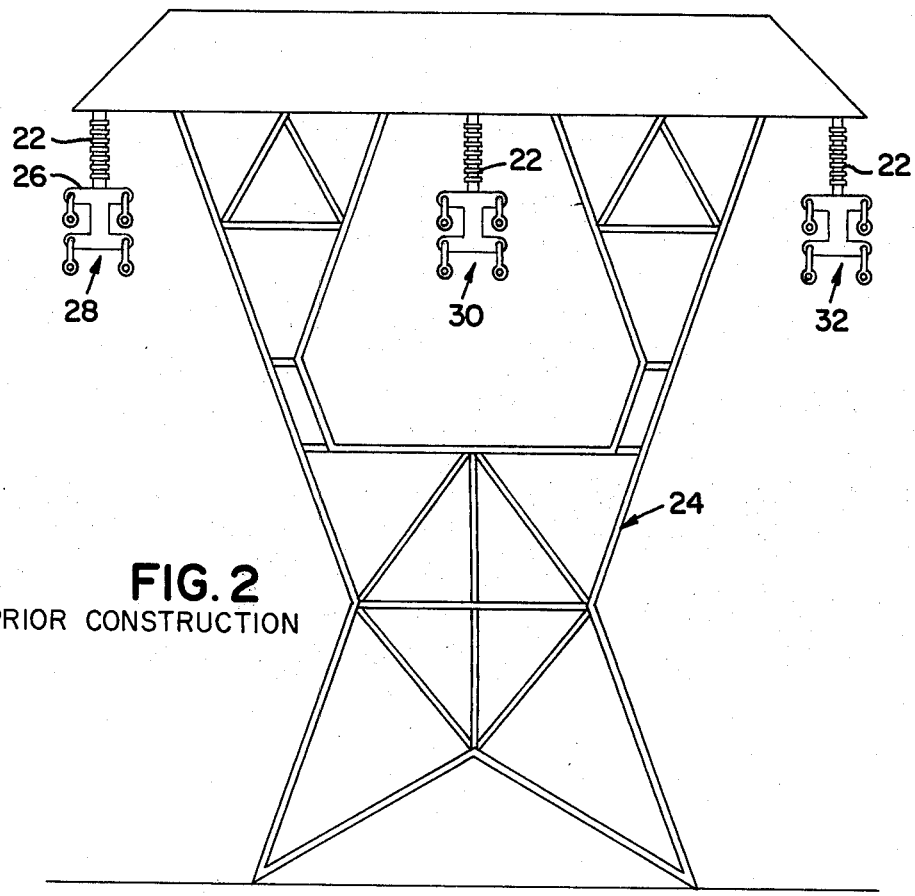
FIG. 2 is an enlarged vertical section of the transmission line of FIG. 1, and a tower supporting a three phase line comprised of three bundles of transmission conductors.

As indicated earlier, overhead transmission lines generally have several different electrical phases, with each phase having one or more wires or conductors. If they have more than one conductor per phase, the conductors, as a bundle, which is represented by single line 20 in FIG. 1, are suspended from towers 24 by an insulator 22 on each tower 24, the insulator supporting a conductor supporting yoke or hanger 26. FIG. 2 of the drawing shows one such tower having three insulators 22 nad hangers 26 suspending three conductor bundles comprising a three phase line, the three phases of the line being designated by numerals 28, 30 and 32.

FIG. 3 illustrates in cross section a single phase bundle consisting of conductors or subconductors 34, 36, 38 and 40, with the wind blowing in the direction indicated by the arrow in FIG. 3. As shown, the windward conductors 34 and 36 disturb the flow of the wind and produce wakes indicated by numerals 42 and 44. These wakes are regions of reduced flow velocity and increased flow complexity and have the effect of producing a force on the leeward conductors 38 and 40 that is different than that imposed on the windward conductors 34 and 36, and that changes in accordance with the different positions of the leeward conductors at successive instants of time. Due to the complexity of these changes in force, as explained earlier, the conductors 38 and 40 tend to become aerodynamically unstable and oscillate about the normal positions in which they should lie.

The conductors of a bundle are normally held in fixed relationship by means of spacers placed at intervals along the length of a conductor span between the towers supporting the conductors. Such spacers may be separated by 100 to 300 feet depending upon the particular design of the line. One such spacer 46 is illustrated in FIG. 4, the spacer having a frame 48 and arms 49. At the outward ends of the arms are provided clamps 50 for respectively clamping on the conductors of a bundle, with each clamp having seats 52 cooperating with keepers 54 (and tightened by screws 56) to secure the spacer in the bundle.

Because of the presence of such spacers, the oscillatory motions of the downwind conductors, conductors 38 and 40 for example, is coupled with companion upwind conductors 34 and 36 so that the oscillations of 38 and 40 excite all conductors of the bundle into motion and sometimes results in conductors striking each other midway between spacers. In addition, such conductor motions exert significant forces on the spacers 46, and on insulators 22 and hangers or yokes 26 at the supporting towers.

A prior bundle construction designed to reduce conductor instability is illustrated in FIG. 5. As indicated, the bundle has a twisted cross section as it progresses from tower to tower. The effect of this twisting is that each conductor occupies varying positions in the wake of any other conductor of the bundle located on the windward side so that the complex wake forces that cause oscillation of a leeward conductor tend to be averaged out over the length of the leeward conductor.

For example, if the wind is blowing into the paper in FIG. 5, then a leeward conductor of the bundle, such as conductor 58, is only behind and in the wake of another conductor near the middle of the span but does not reside over on a substantial portion of its length in any one position relative to any windward conductor, but scans through various positions of the windward conductor for various downwind locations. In FIG. 5 the spacers 46 of FIG. 4 are shown spacing the conductors between the means supporting the conductors at the towers. Such a construction is effective to suppress oscillations in the leeward conductors caused by the wakes formed behind the windward conductors, but is a very costly and awkward way to achieve such results, as well as producing undesirable torques on the line and its supporting structures, as explained earlier.

Figure 7:
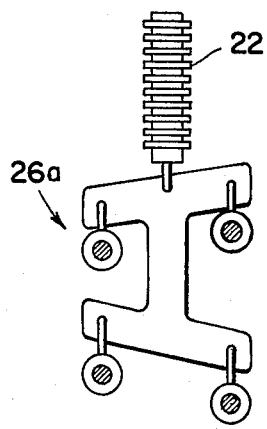
FIG. 7 is a transverse section showing one yoke or hanger of the invention.

The present invention achieves such oscillation suppression without the costly and cumbersome twisting of the bundle by inducing vertical meandering of the conductors of the bundle with respect to the path that they would normally follow from the tower to tower. In this manner the downwind conductor or conductors occupy various positions in the wake of the windward conductor along the length of the bundle. The meandering is achieved through spacers or spacing devices 26a, 72 and 74 (FIGS. 7 to 9) which distort the cross section of the bundle as the conductors move from spacer to spacer, the spacers being at tower positions A and E and at locations 60, 62 and 64 between the tower positions, as shown in FIG. 6. As provided by the spacers of FIGS. 7, 8 and 9, which are constructed for a four conductor bundle, the cross section of the bundle is a trapezoidal, vertically oriented shape, with the shorter parallel sides lying on one side or the other of the bundle as successive spacers are considered. The successive yokes or hangers 26a are considered spacers for the purpose of the present invention, and, are thus constructed so as to lend a trapezoidal cross section to a four conductor bundle at the tower supports, as illustrated in FIG. 7.

An essential feature of the invention then is the simplicity in which the variation along each sub-span of the angle of attack between pairs of conductors is achieved in which one conductor is in or near the wake of the other. The angle of attack is the angle of the line adjoining the centers of conductors 34 with 38, for example, with respect to a line parallel to the wind. Such a variation in the angle of attack, as indicated earlier, tends to prevent the forces acting on the leeward conductor from acting in concert and thereby preventing augmentation of conductor motion by the wind forces that causes wake-induced oscillations.

As discussed earlier, a further advantage of the bundle construction of the invention is the torque-free condition of the bundle when it is suspended from spaced supports. In the case of a four conductor bundle, the torque-free condition is effected by disposing the two, two-conductor bundles, that form a four conductor bundle, in opposite directions at each spacer 26a, 72, 74), and mechanically connected together so that the two, two-conductor bundles maintain each other's twisting torque. In this way, the net torque on the bundle is zero.

Figure 10:
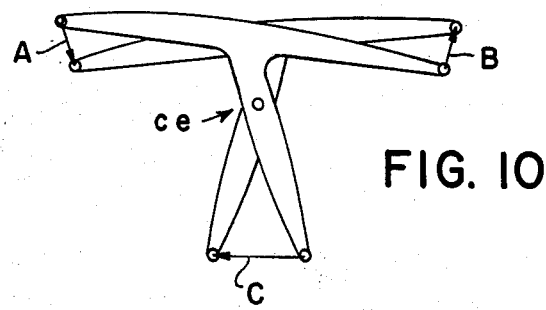
FIG. 10 is a transverse section showing two adjoining spacers of a three conductor bundle.

In the case of an overhead, three conductor bundle supported and suspended from spaced supports, with, for example, the top pair of conductors being generally horizontally opposed, as shown in FIG. 10 of the drawings, the top pair can be disposed in opposite directions at successive spacers by imposing a horizontal meander on the bottom conductor such that the torque in the bundle and on the spacer is zero. To appreciate the relationships involved in such a case, it is necessary to take note of the existance of the centroid of the bundle which is the center of effort $c\ e$ (FIGS. 10 and 11) of the tensions of the three suspended conductors. In the structure of FIG. 10, which is a schematic cross sectional view of the bundle without perspective, with the depth of view being from one spacer to the next adjacent spacer, the conductors are represented by the arrows A, B and C. The adjacent spacers are identical in configuration but are installed in a reverse position, with the center of efforts of the two spacers being aligned and coinciding with that of the bundle. The lengths of the arrows A, B and C are proportional to the components of the conductor tensions that are perpendicular to the bundle. Since the center of efforts of the spacers and bundle coincide, the sum of these component forces is zero, the component forces individually applying torques to the spacers tending to rotate them about their centers of effort until they assume an equilibrium position in the bundle. Since the spacers reside in a position in which the torques act upon each spacer in a way that balances out, the torque resulting from A, B and C cancel out.

Figure 11:
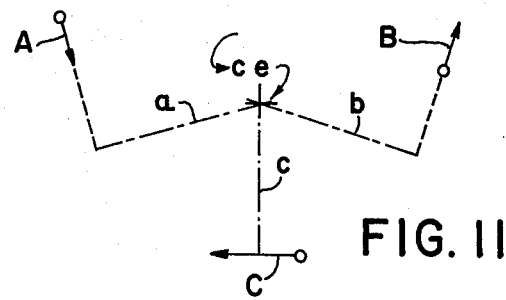
FIG. 11 is a vector diagram showing torque forces involved with the two spacers of FIG. 10.

FIG. 11 shows these torque elements, with the torque resulting from force A being equal to the magnitude of force A multiplied by the perpendicular distance $a$ from A to the center of effort $c\ e$. The total torque, which must be zero, is $Aa + Bb - Cc$, with the signs being chosen according to the convention that counterclockwise torques are positive. With the total of these torques being zero, it is clear that neither spacer exerts a torque on the other. If the other spacers and supports of the span exhibit an alternating pattern between neighbors, which is exemplified in FIG. 10, then no spacer or support will exert torque upon its neighbors, and the bundle span is torque-free.

Figure 8:
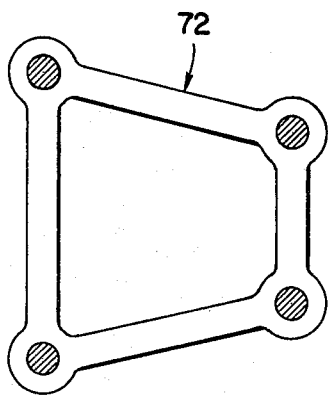
FIG. 8 is a transverse section through the bundle of FIG. 6 at the location of a first spacer of the invention.
Figure 9:
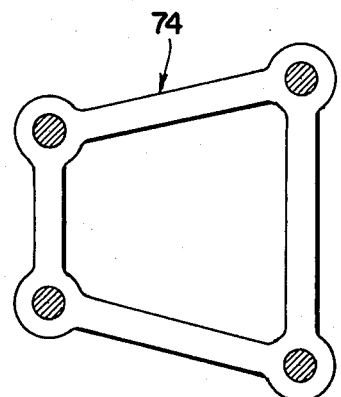
FIG. 9 is a similar section at an immediately adjacent spacer of the invention located in the bundle of the invention.

As can be seen in FIGS. 8 to 10, the spacers are identical in configuration; however, they are installed in a bundle in reverse, 180° positions about their vertical axes.

Thus, in practicing the invention, after a bundle line is strung and suspended, using the yokes of FIG. 7, the spacers 72 and 74 of the invention are installed in the bundle, along the length thereof, with alternate spacers and yokes being reversed or rotated with respect to each immediately adjacent spacer and yoke. The clamps of the spacers and yokes are so positioned with respect to each other that a set of such spacers and yokes installed in the bundle results in torque-free conditions, and pairs of conductor clamps attached to pairs of generally horizontally opposed conductors at two adjacent spacer locations or at a yoke and an adjoining spacer location are not coplanar or colinear.

In a preferred embodiment when there are four conductors in a bundle, each set of four clamps is out of the plane of immediately adjacent sets by a distance approximating four or more times the diameter of the conductors of the bundle, though the invention is not limited thereto.

In the case of a two conductor bundle, with conductors in the same horizontal plane, the present invention is not readily practiced since it requires an external torque to hold a conductor in a vertically meandering posture, with the torque being applied at the locations of the spacers where no provision is available for applying such an external torque. An external torque, however, can be accomplished by using appropriate weights at or adjacent the locations of the spacers.

Figure 12:
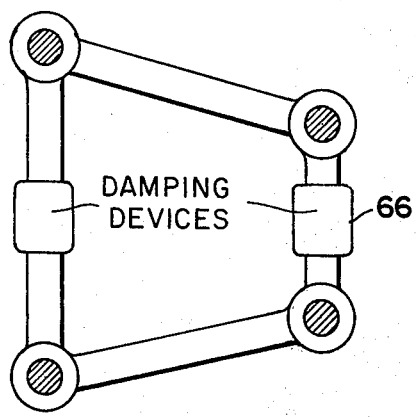
FIG. 12 is a further enlarged transverse section showing a spacer of the invention having two damping devices.

FIG. 12 of the drawings shows a trapezoidal shaped conductor spacer having elements 66 adapted to dampen oscillations or vibrations of the conductors of FIG. 3 that are not wake induced. Such damping spacers may be used between locations of the spacer and yokes of FIGS. 7 to 9 along the length of line 20.

While the invention has been described in terms of preferred embodiments, the claims appended hereto are intended to encompass all embodiments which fall within the spirit of the invention.

Having thus described my invention and certain embodiments thereof, I claim:

1. An arrangement spacing at least three overhead conductors in an aerodynamically stable, torque-free manner, with two of said conductors being disposed in generally the same horizontal plane, the arrangement comprising at least two devices spacing the conductors at spaced apart locations lengthwise thereof, with each spacing device having a clamping means respectively attaching the spacing devices to the conductors at said spaced apart locations, the clamping means of each spacing device attaching the same to the two horizontal conductors being vertically displaced from each other, the clamping means of the two spacing devices attached to the same horizontal conductor being vertically displaced from each other, such that the horizontal conductors respectively meander in an opposed, vertical manner from spacer to spacer.

2. The arrangement of claim 1 in which the spacing devices provide a horizontal meander in the third conductor.

3. The arrangement of claim 1 wherein at least one of the spacing devices includes means for supporting the conductors at a support location of the conductors.

4. The arrangement of claim 1 in which the spacing devices are substantially identical in size and configuration but present a different configuration to a bundle of the conductors in cross section when one of the spacing devices is rotated 180° about its vertical axis with respect to the other spacing device.

5. The arrangement of claim 4 in which the conductors in the cross section of the bundle are spaced from one another in a trapezoidal configuration.

6. The bundle of conductors according to claim 4 in which the spacers are provided with dampers for damping vibrations of the conductors other than wake-induced oscillations.

7. A method of suppressing aerodynamic instability in a bundle of three or more overhead conductors in a torque free manner, with two of said conductors being located in generally the same horizontal plane, the method comprising the steps of vertically displacing the two horizontal conductors in an opposed, undulating manner and maintaining the horizontal conductors in such an opposed undulating manner by inserting at least two spacing devices in the cross section of the bundle at spaced locations lengthwise of the bundle, and clamping the two spacing devices to the conductors at said spaced locations using clamps on the two horizontal conductors at one location lengthwise of the bundle that are vertically displaced from each other, and, using clamps at the two spaced locations of each of the two horizontal conductors that are vertically displaced from each other.

* * * * *